2,805,864
TWIST TYPE CHUCK

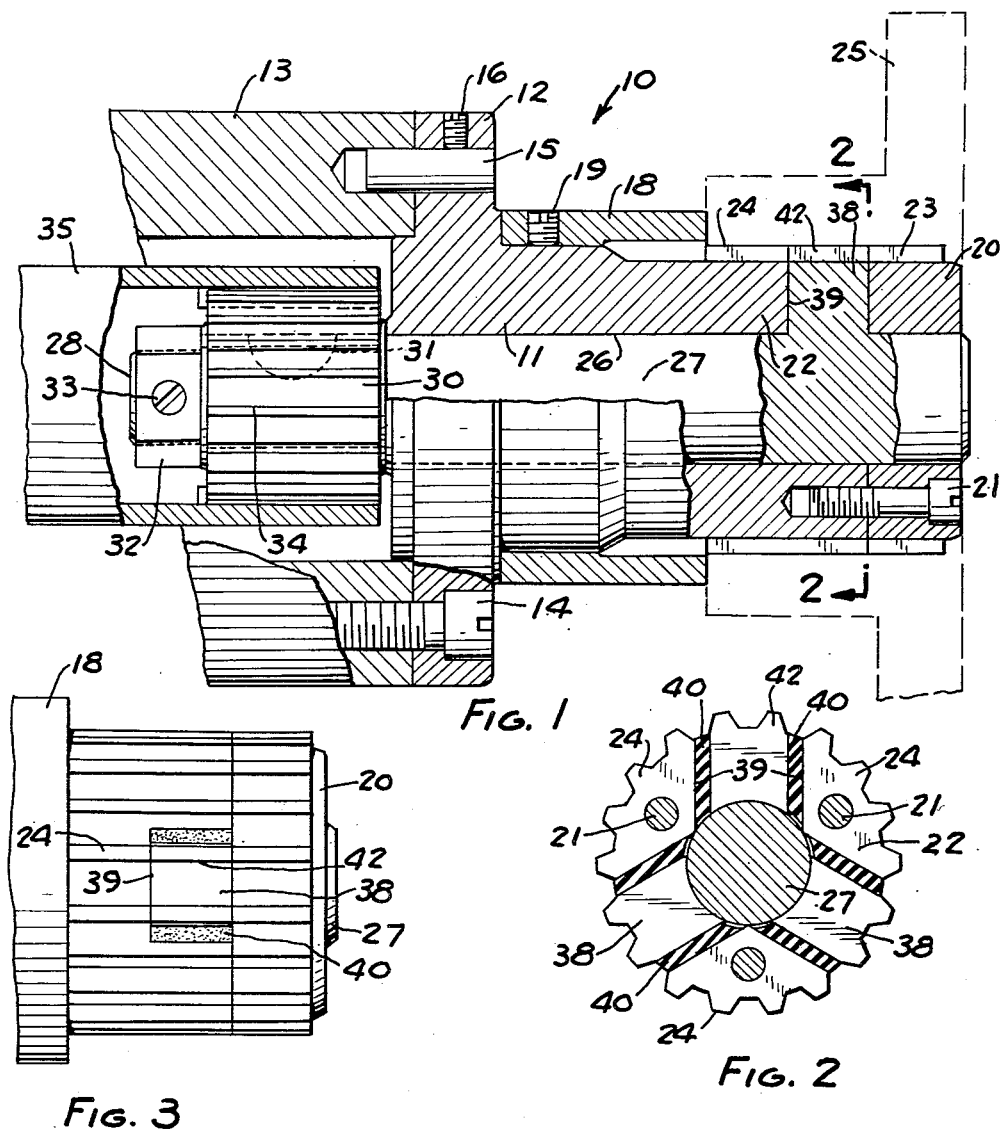

John J. Parker and London T. Morawski, Detroit, Mich.

Application June 11, 1956, Serial No. 590,589

8 Claims. (Cl. 279—1)

This invention relates to chucks for holding work pieces and the like on supports such as machine tools. The invention can be used for holding a wide variety of work pieces on stationary supports or on moving supports such as the spindle of a machine tool.

An object of the invention is to provide a simplified, inexpensive chuck structure having quick, convenient operating characteristics and having increased durability under the corrosive and abradant action of coolants, waste materials and the like.

The invention generally contemplates a chuck body with an internal rockable shaft having radial portions which extend through openings in the body for holdingly engaging and releasing a work piece. Veins of a resiliently distortable material such as rubber are bonded to the sides of the elements and to the adjacent walls of the body to seal foreign matter out of the chuck interior and to resiliently rock the work piece engaging elements counter to the rocking movement provided by the shaft during operation. One form of the invention in the accompanying drawings:

Fig. 1 is a partly sectional view of a chuck according to this invention.

Fig. 2 is a sectional view on line 2—2 of Fig. 1.

Fig. 3 is an elevational view of the work piece engaging end of the chuck.

Shown in the drawings is a chuck 10 according to this invention having a body 11 with a radial flange 12 adapted to be secured to a supporting portion of a machine tool such as a spindle 13 by such means as cap screws 14. Flange 12 is shown as being provided with a positioning dowel 15 secured in place by a set screw 16. A body 11 preferably has a work piece locator such as skirt 18 fixed in place by a set screw 19.

Body 11 includes an end portion 20 in the form of an axially detachable cap secured in place by cap screws 21. Cap 20 and adjacent body portions 22 are adapted to receive and support a work piece, and in the form of the invention shown are provided with teeth 23 and 24 for dentally engaging internal teeth on a work piece such as that shown in phantom at 25.

Body 11 has an internal bore 26 with a shaft 27 rockably disposed therein. Shaft 27 has an outwardly projecting end portion 28 with a pinion 30 non-rotatably secured thereon by a key 31 and a nut 32 with a shaft engaging set screw 33. Pinion 30 is provided with teeth 34 for dental engagement by an actuator 35.

Shaft 27 has radially extending portions 38 which project through radial openings 39 in the end portion of body 22. In the form of the invention shown openings 39 comprise axial recesses in end portion 22 of the body, the recesses being closed by cap 20. Projections 38 are circumferentially smaller than openings 39 to provide spaces between the sides of projections 38 and the adjacent walls of openings 39. Each of the spaces is filled with a vein 40 of a preferably non-metallic resiliently distortable material such as a natural or synthetic rubber or plastic. This material is preferably bonded to the metal of the projections and body for purposes to be described. The outer end of each projection 38 is provided with teeth 42 for engaging work piece 25.

In use it may be assumed that the chuck has been assembled on a spindle 13 of a machine tool (not shown) and that actuator 35 has been engaged with pinion 30 on shaft 27. When the spindle is at rest and actuator 35 is inactuated, the resilient material of veins 40 holds projections 38 generally centered in their respective openings 39 so that teeth 42 thereon are aligned with teeth 23 and 24 on body portion 22 and cap 20 for dental engagement with work piece 25.

After the work piece has been slipped over the end of the chuck, actuator 35 is turned to rock shaft 27 relatively to body 11 thereby rocking projection teeth 42 circumferentially against the action of resilient veins 40 into locking engagement with the teeth on work piece 25. Spindle 13 and actuator 35 may then be rotated to facilitate machining of work piece 25. After the machining is completed and the spindle is stopped, actuator 35 is inactuated and the resilient material of veins 40 rocks projections 38 and shaft 27 in a return direction for releasing teeth 42 from locked engagement with the work piece. The work piece may then be slipped off of the end of the chuck. To machine another work piece, the process is repeated.

The bond of the vein material with the metal of projections 38 and the walls of opening 39 seals foreign matter such as dirt, cooling fluids and abradant materials such as metal dust and chips out of the interior of the chuck so that the chuck interior is preserved against corrosion and abrasion during operation. The life of the chuck is thus prolonged.

We claim:

1. A chuck for holding work pieces comprising, a body adapted to be mounted on a support such as a machine tool, said body being adapted to receive and support a work piece, rockable shaft means on said body, yieldable means operative to resist rocking of said shaft means relatively to said body, said yieldable means including a non-metallic resiliently distortable material such as a natural or synthetic rubber or plastic, work piece engaging means on said shaft means adapted to holdingly engage and release a work piece upon rocking movement thereof, operating means operable to rock said shaft means against the resistance of said yieldable means, said yieldable means being operative to return said shaft means when the same is released by said operating means, whereby to rock said work piece engaging means to and from holding relation with a work piece.

2. A chuck for holding work pieces comprising, a body adapted to be mounted on a support such as a machine tool, said body being adapted to receive and support a work piece, rockable shaft means on said body, said shaft means and said body having generally radially extending opposed spaced apart portions movable toward and away from each other responsively to rocking of said shaft means, yieldable means operative to resist rocking of said shaft means relatively to said body, said yieldable means including a non-metallic resiliently distortable material such as a natural or synthetic rubber or plastic disposed between said portions of said shaft means and body, work piece engaging means on said shaft means adapted to holdingly engage and release a work piece upon rocking movement thereof, operating means operable to rock said shaft means against the resistance of said yieldable means, said yieldable means being operative to return said shaft means when the same is released by said operating means, whereby to rock said work piece engaging means to and from holding relation with a work piece.

3. A chuck for holding work pieces comprising, a body adapted to be mounted on a support such as a machine tool, said body being adapted to receive and support a work piece, said body having a bore therein, said body having aperture means extending from said bore to the periphery of said body, shaft means rockable in said bore, work piece engaging means disposed in said aperture means, said work piece engaging means being rockable in said aperture means responsively to rocking of said shaft means for holdingly engaging and releasing a work piece, yieldable means operative to resist rocking of said work piece engaging means relatively to said aperture means, said yieldable means including a non-metallic resiliently distortable material such as a natural or synthetic rubber or plastic, operating means operable to rock said shaft means against the resistance of said yieldable means, said yieldable means being operative to return said shaft means when the same is released by said operating means, whereby to rock said work piece engaging means to and from holding relation with a work piece.

4. A chuck for holding work pieces comprising, a body adapted to be mounted on a support such as a machine tool, said body being adapted to receive and support a work piece, said body having a bore therein, rockable shaft means in said bore, said body having a plurality of generally radial openings extending from said bore to the periphery of said body, work piece engaging elements disposed in said openings and operatively connected to said shaft means, portions of said elements and portions of said body defining said openings being spaced apart and being movable toward and away from each other responsively to rocking of said shaft means, a vein of a resiliently distortable material disposed between said portions and being operative to yieldably resist rocking of said shaft means relatively to said body, said elements being adapted to holdingly engage and release a work piece upon rocking movement thereof, operating means operable to rock said shaft means against the resistance of said veins, said veins being operative to return said shaft means when the same is released by said operating means, whereby to rock said elements to and from holding relation with a work piece.

5. The chuck defined in claim 4 wherein said veins are formed of a non-metallic resiliently distortable material such as a natural or synthetic rubber or plastic bonded to said portions of said elements and body to seal foreign matter out of the chuck interior.

6. A chuck for holding work pieces comprising, a body adapted to be mounted on a support such as a machine tool, said body being adapted to receive and support a work piece, said body having a bore therein, rockable shaft means in said bore, said body having a plurality of generally radial openings extending from said bore to the periphery of said body, said shaft means having a plurality of generally radially extending work piece engaging elements projecting into said openings, each of said elements having generally radially extending sides apposed to and spaced from the portions of said body defining said openings so that said elements can rock relatively to said body, a vein of a non-metallic resiliently distortable material such as a natural or synthetic rubber or plastic disposed between and bonded to each side portion of each element and the portion of said body apposed thereto, whereby to yieldably resist rocking of said shaft means relatively to said body and to seal foreign matter out of the chuck interior, said elements being adapted to holdingly engage and release a work piece upon rocking movements thereof, operating means operable to rock said shaft means against the resistance of said veins, said veins being operative to return said shaft meaans when the same is released by said operating means, whereby to rock said work piece engaging means to and from holding relation with a work piece.

7. The chuck defined in claim 6 wherein said body and said elements are provided with teeth for dentally engaging a toothed work piece.

8. A chuck for holding work pieces comprising, a body adapted to be mounted on a support such as a machine tool and adapted to receive and support a work piece, rockable means on said body, said body and rockable means having means thereon movable toward and away from each other responsively to relative rocking of said rockable means, a layer of non-metallic resiliently distortable material disposed between said portions and being operative to resist relative movement thereof, said body and rockable means being operative to engage and release a work piece upon relative rocking movement thereof, said layer of material being operative to urge said body and rockable means in a return direction after a relative rocking movement thereof.

References Cited in the file of this patent

UNITED STATES PATENTS

| | | |
|---|---|---|
| 1,188,369 | Chernack | June 20, 1916 |
| 2,346,706 | Stoner | Apr. 18, 1944 |
| 2,440,908 | Mueller | May 4, 1948 |
| 2,468,867 | Collins | May 3, 1949 |
| 2,765,175 | Parker et al. | Oct. 2, 1956 |